US008201814B2

(12) United States Patent
Döpping et al.

(10) Patent No.: US 8,201,814 B2
(45) Date of Patent: Jun. 19, 2012

(54) WAFER CATCHING DEVICE

(75) Inventors: Jürgen Döpping, Freiberg (DE); Matthias Reinecke, Pesterwitz (DE); Holger Brosche, Dresden (DE); Hans-Joachim Gretzschel, Dresden (DE); Steffen Pollack, Dresden (DE)

(73) Assignee: DEUTSCHE SOLAR GmbH, Freiberg (DE)

( * ) Notice: Subject to any disclaimer, the term of this patent is extended or adjusted under 35 U.S.C. 154(b) by 1230 days.

(21) Appl. No.: 11/935,195

(22) Filed: Nov. 5, 2007

(65) Prior Publication Data

US 2008/0295662 A1 Dec. 4, 2008

(30) Foreign Application Priority Data

Nov. 8, 2006 (DE) ........................ 10 2006 052 908

(51) Int. Cl.
*B23Q 3/00* (2006.01)

(52) U.S. Cl. ............ 269/289 MR; 269/289 R; 269/309; 269/310

(58) Field of Classification Search ........... 269/289 MR, 269/289 R, 309, 310
See application file for complete search history.

(56) References Cited

U.S. PATENT DOCUMENTS

| | | | | |
|---|---|---|---|---|
| 1,065,979 | A * | 7/1913 | Spencer | 269/9 |
| 3,640,398 | A * | 2/1972 | Loxley et al. | 211/41.18 |
| 5,205,028 | A * | 4/1993 | Leonard | 29/271 |
| 5,441,091 | A * | 8/1995 | Collins | 144/287 |
| 5,533,243 | A * | 7/1996 | Asano | 29/25.01 |
| 6,006,736 | A | 12/1999 | Suzuki et al. | 125/13.02 |
| 6,119,673 | A | 9/2000 | Nakaura | 125/12 |
| 6,532,642 | B1 * | 3/2003 | Wingo | 29/558 |

FOREIGN PATENT DOCUMENTS

| | | |
|---|---|---|
| DE | 102 10 021 A1 | 8/2002 |
| DE | 102 10 024 A1 | 9/2002 |
| JP | 61111557 A | 5/1986 |

OTHER PUBLICATIONS

German Examination Report 10 2006 052. 908.1-24 (3 pages total).
German Examination report for DE 10 2006 052.910.3-24.

* cited by examiner

*Primary Examiner* — George Nguyen
(74) *Attorney, Agent, or Firm* — James B. Conte; Husch Blackwell LLP

(57) ABSTRACT

The invention relates to a device for catching a plurality of slices to be detached from a holding element, having a frame, a holder, attached to the frame, for accommodating the holding element holding the slices, at least two guiding elements on the sides and at least one bottom catching element, the guiding elements on the sides each being arranged on the frame in pairs on the right and the left.

6 Claims, 2 Drawing Sheets

WAFER CATCHING DEVICE

BACKGROUND OF THE INVENTION

Field of the Invention

The invention relates to a device for gently catching thin slices, especially wafers from semiconductor material, especially silicon.

During the manufacture of wafers, silicon blocks are glued to a holding element. Thereafter, the silicon block is sawn into individual thin slices, which still adhere to the holding element after the sawing process. For further processing the slices are detached from the holding element. As the thin slices are extremely delicate, it is absolutely necessary to gently and safely store them during and after the detaching from the holding element.

SUMMARY OF THE INVENTION

The invention is based on the object of creating a device with which wafers can be caught in an easy, gentle and secure way.

Said object is achieved by a device for catching a plurality of slices to be detached from a holding element, comprising a frame, a holder, attached to the frame, for accommodating the holding element holding the slices, at least two guiding elements on the sides and at least one bottom catching element, the guiding elements on the sides each being arranged on the frame in pairs on the right and the left. The core of the invention consists in connecting the holding element with the silicon slices in a frame and keeping the silicon slices stable during and after the detaching from the holding element through rollers arranged on the sides and below the silicon slices. This way, damage to the silicon slices is avoided.

Additional features and details of the invention result from the description of an embodiment based on the drawing.

DESCRIPTION OF THE PREFERRED EMBODIMENT

Figure 3:
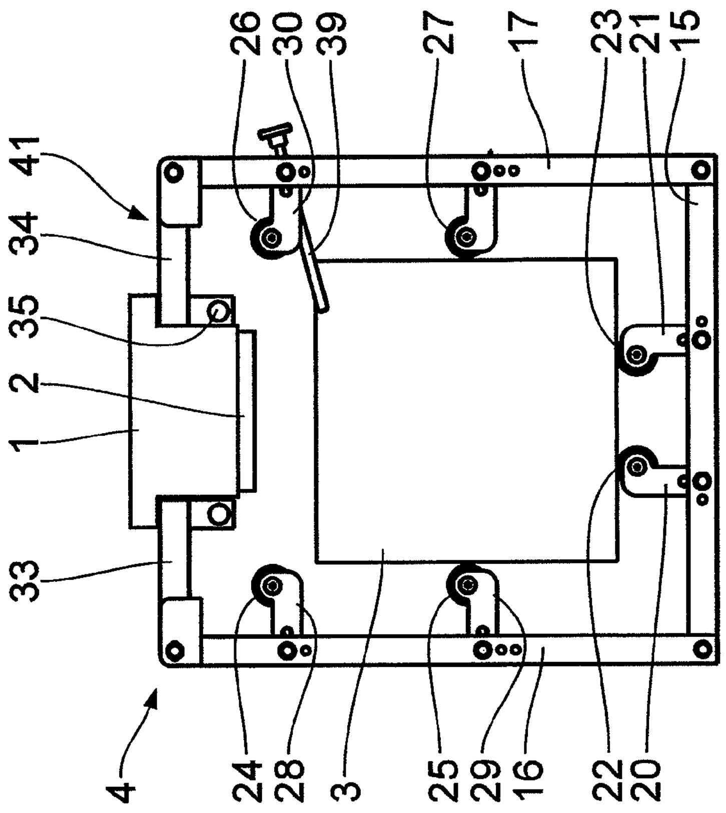
FIG. 3 shows a side view according to FIG. 2, with the silicon slices being detached from the holding element.

In the following, the configuration of an embodiment of a catching device 4 will first be described in more detail with reference to FIGS. 1 to 3. The catching device 4 essentially exhibits the shape of a cube in a lattice shape. The front sides are formed by a fore and a rear U-shaped front part 13, 14, each consisting of a base strut 15 running in a cross direction and a left and a right leg 16, 17 each extending upwardly therefrom. The front parts 13, 14, which face one another, are each connected with each other near the top and bottom ends of the legs 16, 17 by an upper longitudinal carrier 18 and a lower longitudinal carrier 19 running in a longitudinal direction, so that there emerges a rigid, essentially cubic trestle. In the area of the base struts 15 of both the fore front part 13 and the rear front part 14 there are arranged two swingable arms 20, 21 between which there are arranged rotatably mounted rollers 22, 23. The rollers 22, 23 form a bottom catching element. The arms 20, 21 are lockable in the upwardly swung position shown in FIG. 1. Between the two left legs 16 on the one side, and the two right legs 17 on the other side, there are arranged in each case above one another on the left side and on the right side, respectively, guiding elements on the sides in the form of rollers 24 and 25, and 26 and 27, respectively, which are carried by corresponding arms 28 and 29, and 30 and 31, respectively, which are swingably attached to the legs 16 and 17, respectively. Along the swing axes of the arms 28 to 31, the left and the right legs 16 and 17 are connected to one another by means of swing rods 38. On one of said swing rods 38, there may be arranged, displaceably mounted, a fore and a rear end safety device 39 and 40. The end safety devices 39, 40 serve to protect the slices 3 against falling over and to prevent them from falling out of the catching device 4. To this end, the end safety devices 39, 40 shown in FIGS. 1 to 3 point, in the form of pointers, towards the inside of the cube. The arm 28 is attached to the front parts 13, 14 at the same height as the arm 30. Likewise, the arm 29 is attached to the front parts 13, 14 at the same height as the arm 31. The upper rollers 24 and 26, and the lower rollers 25 and 27, respectively, are adjustable towards one another, thereby making the catching device 4 adaptable to the width of the slices 3. All rollers 22 to 27 are provided, on their surface, with a plastic or rubber hose 32, which exhibits circumferential grooves in a large number. The grooves are sized such that there can be held in each groove exactly one slice 3 in an essentially vertical position in a tilt-safe manner. The grooves exhibit, for example, a rectangle profile or a triangle profile with a profile height of 0.1 to 10 mm, especially 0.5 to 5 mm, especially 1 to 3 mm.

At the top end of the left and right legs 16 and 17 there are exchangably articulated in each case left and right carrier arms 33 und 34. The carrier arms 33 and 34, which face one another in the longitudinal direction, are connected by rods 35. Between the carrier arms 33, 34, which face one another in a cross direction and which are swung into the horizontal, and between the rods 35, respectively, there remains an accommodating gap 36 to accommodate the holding element 1. Together with the rods 35, the carrier arms 33, 34 form a holder 41, which is tuned to the dimensions of the holding element 1. At the tops ends of the left and right legs 16 and 17 there are also attached in each case transportation holders 37.

Apart from the end safety devices 39, 40, the catching device 4 is, both in the longitudinal and in the cross direction, essentially mirror-symmetrical to a vertically running central longitudinal and central cross plane, respectively.

In the following, the function of the catching device 4 will be described. For the manufacture of wafers, blocks of a raw material are first sawn into columns, which, in their cross-section, almost have the shape of the wafers to be manufactured. Generally they can be blocks of any material, especially of any semiconducting material, preferably of silicon. The wafers are especially envisaged for use in photovoltaics. The columns exhibit a dimension (length×width×height) of e.g. 500×100×100 mm up to 900×400×400 mm. On a longitudinal surface, the columns are glued, via a glue layer 2, to a holding element 1 consisting, for example, of glass. Thereafter, the columns are sawn by a commercially available wire saw into slices 3. The slices 3 exhibit a thickness of 100 μm to 400 μm. In accordance with the aforementioned cross-section of the columns, the slices 3 have a surface of 100 mm×100 mm to 400 mm×400 mm.

Figure 1:
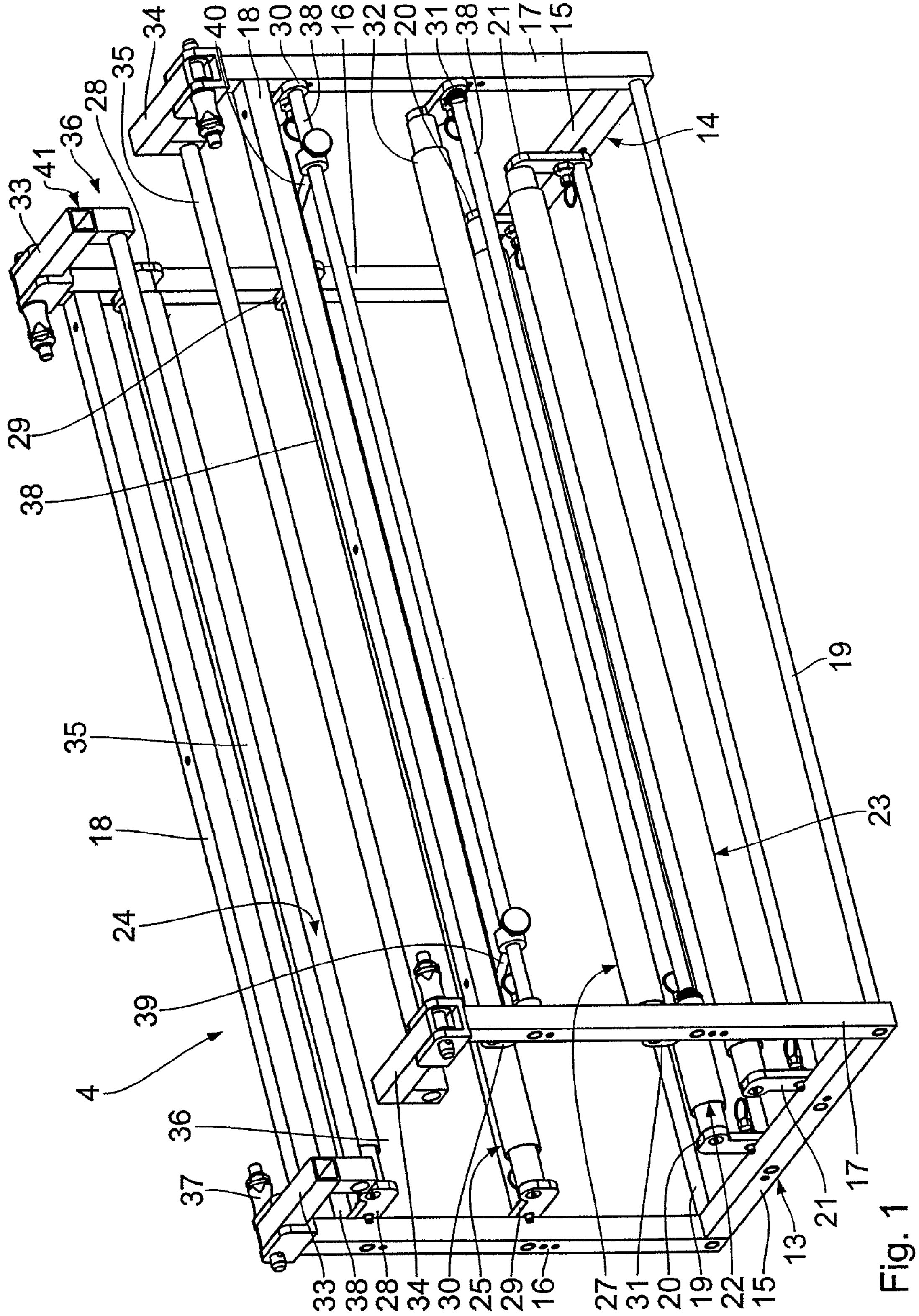
FIG. 1 shows a catching device for silicon slices.
Figure 2:
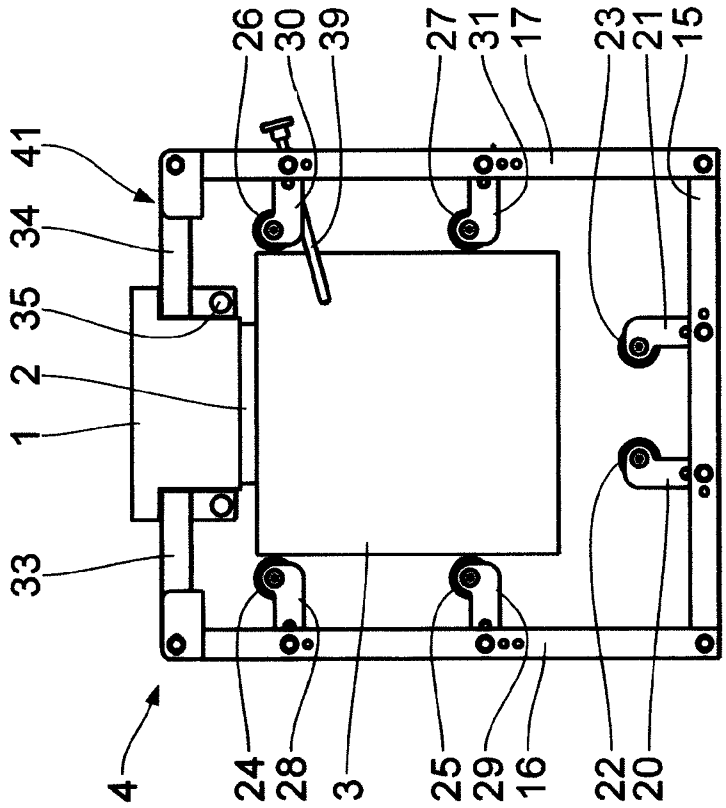
FIG. 2 shows a side view of the catching device according to FIG. 1, with the silicon slices being attached to a holding element.

After the end of the sawing process, the holding element 1, together with the slices 3 attached thereto, is inserted into the catching device 4 as shown in FIG. 1. The catching device 4 serves the gentle stabilisation of the slices 3 for as long as they are attached to the holding element 1, and the guiding, catching and holding of the slices 3 after they have been removed from the holding element 1.

Before the slices 3 are detached from the holding element 1, they can e.g. run through a sequence of cleaning steps or other processing processes. The detaching takes place in a process basin, which is filled with a degluing solution. Up to this point in time, the slices 3, via the glue layer 2, are firmly connected to holding element 1. In order to facilitate the dismantling process, the wire-sawn columns introduced into the catching device 4 can be tilted along their longitudinal axis by an angle of between 0° and 45° against the horizontal. The end of the dismantling process is characterised by the complete detaching of all slices 3 from the holding element 1. After the detaching of the slices 3 from the holding element 1, they are caught in the catching device 4. The slices 3 are safely held in the catching device 4 and, whilst in the catching device 4, can run through further process steps. Finally, the slices 3 in the catching device 4 are transferred into a liquid-filled unloading wagon, with which the slices 3 are conveyed to a singling device. At the end of the process there emerge cleaned, high-quality, singularised wafers made of a semiconductor material, especially silicon. The advantage of the invention is that the catching device 4 holds the individual slices 3 at all times in a gentle and safe manner, that it enables good access to each individual slice from both sides for possible cleaning or other processing processes and, finally, that is protects the slices 3 against damage.

What is claimed is:

1. A device (4) for catching a plurality of slices (3) to be detached from a holding element (1), comprising a. a frame, said frame having sides b. a holder (41), attached to the frame, for accommodating the holding element (1) holding the slices (3), c. at least two guiding elements on the sides of the frame and d. at least one bottom catching element, e. the guiding elements on the sides each being arranged on the frame in pairs on the right and the left, f. wherein the guiding elements on the sides are adjustable towards one another in pairs in a cross direction, g. wherein the holder (41) is exchangeable and h. wherein the holder (41) comprises a pair of left carrier arms (33) and right carrier arms (34) being exchangeably articulated to the frame and being connected by rods (35).

2. A catching device (4) according to claim 1, wherein the guiding elements on the sides are designed as rotatably mounted rollers (24, 25, 26, 27).

3. A catching device (4) according to claim 1, wherein the guiding elements are provided, on their surface, with a soft plastic, especially a rubber hose to prevent damage to the slices (3).

4. A catching device (4) according to claim 1, wherein the surface of the guiding elements exhibits a plurality of circumferential grooves for holding the slices (3) in a vertical position.

5. A catching device (4) according to claim 1, wherein the frame exhibits transportation holders (37).

6. A catching device (4) according to claim 1, wherein end safety devices (39, 40) are envisaged, which prevent the slices (3) from falling out of the catching device (4).

* * * * *